(12) United States Patent
Zatloukal et al.

(10) Patent No.: US 9,405,947 B2
(45) Date of Patent: *Aug. 2, 2016

(54) EMULATED RADIO FREQUENCY IDENTIFICATION

(71) Applicant: Varia Holdings LLC, Brooklyn, NY (US)

(72) Inventors: Peter Zatloukal, Kirkland, WA (US); G. Eric Engstrom, Kirkland, WA (US); Cindy M. Smith, Kirkland, WA (US)

(73) Assignee: Varia Holdings LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,970

(22) Filed: Jan. 25, 2013

(65) Prior Publication Data

US 2013/0207777 A1    Aug. 15, 2013

Related U.S. Application Data

(63) Continuation of application No. 13/363,202, filed on Jan. 31, 2012, now Pat. No. 8,381,974, which is a continuation of application No. 10/560,262, filed as application No. PCT/US2004/018397 on Jun. 10, 2004, now Pat. No. 8,127,984.

(60) Provisional application No. 60/478,245, filed on Jun. 13, 2003.

(51) Int. Cl.
*G06K 7/10* (2006.01)
*G06K 7/00* (2006.01)
(Continued)

(52) U.S. Cl.
CPC .............. *G06K 7/10366* (2013.01); *G05B 1/01* (2013.01); *G06K 7/0008* (2013.01);
(Continued)

(58) Field of Classification Search
CPC ............ G06K 7/10366; G06K 7/0008; G06K 19/0723; G07C 9/00111; H04M 1/7253; H04M 1/72575; G05B 1/01; H04B 5/0062
See application file for complete search history.

(56) References Cited

U.S. PATENT DOCUMENTS 4,119,800 A     10/1978  Girardi
5,335,276 A  *  8/1994   Thompson et al. ........... 380/266
(Continued)

FOREIGN PATENT DOCUMENTS

WO         0074406 A1    12/2000
WO      2004114239 A2    12/2004
WO      2004114239 A3    12/2004

OTHER PUBLICATIONS

International Search Report and Written Opinion mailed Feb. 15, 2005 for PCT Application No. PCT/US04/18397, 11 pages.
(Continued)

*Primary Examiner* — Daniel Walsh
(74) *Attorney, Agent, or Firm* — Withrow & Terranova, P.L.L.C.

(57) ABSTRACT

A mobile communication device is equipped with hardware and/or software components to enable the device to output a data in a form of a radio frequency signal, emulating outputting of the data by either an active or a passive RFID transponder. The data may be a security key or an identifier. Emulation of an active RFID transponder includes facilitating selection of the data and instruction to output by a user. Emulation of a passive RFID transponder includes detecting for proximal presence of a RFID reader. Either case, provision of the data to the mobile communication device may include provision of associated signal attribute(s).

32 Claims, 12 Drawing Sheets

(51) Int. Cl.
  *G06K 19/07* (2006.01)
  *G07C 9/00* (2006.01)
  *H04M 1/725* (2006.01)
  *G05B 1/01* (2006.01)
  *H04B 5/00* (2006.01)

(52) U.S. Cl.
  CPC ...... *G06K 19/0723* (2013.01); *G07C 9/00111* (2013.01); *H04B 5/0062* (2013.01); *H04M 1/7253* (2013.01); *H04M 1/72575* (2013.01)

(56) References Cited

U.S. PATENT DOCUMENTS

| | | | |
|---|---|---|---|
| 5,448,620 A | 9/1995 | Gershkovich et al. | |
| 5,473,318 A | 12/1995 | Martel | |
| 5,530,702 A | 6/1996 | Palmer et al. | |
| 5,590,038 A * | 12/1996 | Pitroda | 705/41 |
| 5,793,843 A | 8/1998 | Morris | |
| 5,957,995 A | 9/1999 | Beckmann et al. | |
| 6,026,308 A | 2/2000 | Hsieh | |
| 6,032,054 A | 2/2000 | Schwinke | |
| 6,112,984 A * | 9/2000 | Snavely | 235/379 |
| 6,164,551 A | 12/2000 | Altwasser | |
| 6,167,128 A | 12/2000 | Fuller et al. | |
| 6,314,281 B1 | 11/2001 | Chao et al. | |
| 6,359,866 B1 | 3/2002 | Svensson et al. | |
| 6,421,347 B1 | 7/2002 | Borgstahl et al. | |
| 6,434,395 B1 * | 8/2002 | Lubin et al. | 455/466 |
| 6,476,708 B1 | 11/2002 | Johnson | |
| 6,771,981 B1 * | 8/2004 | Zalewski et al. | 455/557 |
| 6,837,427 B2 * | 1/2005 | Overhultz | G06Q 10/02 235/375 |
| 6,892,052 B2 * | 5/2005 | Kotola et al. | 455/41.2 |
| 7,110,792 B2 | 9/2006 | Rosenberg | |
| 7,155,411 B1 * | 12/2006 | Blinn et al. | 705/40 |
| 7,245,997 B2 | 7/2007 | Kitao et al. | |
| 7,274,909 B2 | 9/2007 | Perttilä et al. | |
| 7,277,809 B1 | 10/2007 | DeWitt, Jr. et al. | |
| 7,280,810 B2 | 10/2007 | Feher | |
| 7,283,044 B2 | 10/2007 | Bandy | |
| 7,324,476 B2 | 1/2008 | Agrawal et al. | |
| 7,375,616 B2 | 5/2008 | Rowse et al. | |
| 7,440,743 B2 | 10/2008 | Hara et al. | |
| 7,502,615 B2 | 3/2009 | Wilhoite et al. | |
| 7,605,701 B2 | 10/2009 | Lee | |
| 8,127,984 B2 * | 3/2012 | Zatloukal | G06K 7/0008 235/375 |
| 8,260,199 B2 * | 9/2012 | Kowalski | 455/41.1 |
| 8,321,346 B2 * | 11/2012 | Celi et al. | 705/43 |
| 8,381,974 B2 * | 2/2013 | Zatloukal et al. | 235/380 |
| 8,393,546 B1 * | 3/2013 | Yen et al. | 235/375 |
| 8,519,847 B2 * | 8/2013 | Honkanen et al. | 340/572.1 |
| 8,618,913 B1 * | 12/2013 | Bailey et al. | 340/10.1 |
| 2001/0028302 A1 | 10/2001 | Degrauwe et al. | |
| 2002/0052193 A1 * | 5/2002 | Chetty | G06F 21/35 455/412.1 |
| 2002/0081987 A1 * | 6/2002 | Yoshida et al. | 455/277.1 |
| 2002/0123325 A1 | 9/2002 | Cooper | |
| 2002/0160775 A1 | 10/2002 | Pecen et al. | |
| 2002/0171534 A1 * | 11/2002 | Ashwin | 340/10.3 |
| 2002/0187779 A1 | 12/2002 | Freeny, Jr. | |
| 2003/0025603 A1 | 2/2003 | Smith | |
| 2003/0069048 A1 | 4/2003 | Liu et al. | |
| 2003/0104848 A1 | 6/2003 | Brideglall | |
| 2003/0114186 A1 * | 6/2003 | Goetz | 455/552 |
| 2003/0155416 A1 * | 8/2003 | Macklin et al. | 235/380 |
| 2003/0158785 A1 | 8/2003 | Erca | |
| 2003/0220711 A1 * | 11/2003 | Allen | G06K 7/0008 700/215 |
| 2004/0030601 A1 * | 2/2004 | Pond et al. | 705/16 |
| 2004/0067778 A1 * | 4/2004 | Sata et al. | 455/566 |
| 2004/0069852 A1 | 4/2004 | Seppinen et al. | |
| 2004/0077313 A1 * | 4/2004 | Oba et al. | 455/41.2 |
| 2004/0077352 A1 | 4/2004 | Mahany | |
| 2004/0087273 A1 | 5/2004 | Perttila et al. | |
| 2004/0093274 A1 | 5/2004 | Vanska et al. | |
| 2004/0111360 A1 * | 6/2004 | Albanese | 705/38 |
| 2004/0127256 A1 * | 7/2004 | Goldthwaite et al. | 455/558 |
| 2004/0171373 A1 | 9/2004 | Suda et al. | |
| 2004/0198233 A1 * | 10/2004 | Pratt | G06K 7/0008 455/67.11 |
| 2004/0204038 A1 * | 10/2004 | Suzuki et al. | 455/553.1 |
| 2004/0248616 A1 | 12/2004 | Pecen et al. | |
| 2004/0255138 A1 * | 12/2004 | Nakae | 713/193 |
| 2004/0263319 A1 | 12/2004 | Huomo | |
| 2005/0014468 A1 | 1/2005 | Salokannel et al. | |
| 2005/0040951 A1 * | 2/2005 | Zalewski et al. | 340/572.1 |
| 2005/0085226 A1 * | 4/2005 | Zalewski et al. | 455/426.1 |
| 2005/0088285 A1 * | 4/2005 | Jei | G06K 7/0008 340/10.51 |
| 2005/0099309 A1 * | 5/2005 | Hum | G08B 26/007 340/573.4 |
| 2005/0116050 A1 * | 6/2005 | Jei | G06K 7/0008 235/492 |
| 2005/0127156 A1 | 6/2005 | Yoo et al. | |
| 2005/0171898 A1 * | 8/2005 | Bishop et al. | 705/39 |
| 2005/0184856 A1 | 8/2005 | Pourchot | |
| 2005/0242921 A1 * | 11/2005 | Zimmerman | G07C 9/00031 340/5.2 |
| 2005/0270185 A1 * | 12/2005 | Esterberg | G06K 7/0008 341/50 |
| 2005/0280537 A1 * | 12/2005 | Feltz | G06K 1/121 340/572.1 |
| 2006/0003772 A1 | 1/2006 | Semper | |
| 2006/0017544 A1 | 1/2006 | Tanaka et al. | |
| 2006/0022802 A1 | 2/2006 | Bridgelall | |
| 2006/0044111 A1 | 3/2006 | Kollar et al. | |
| 2006/0052055 A1 * | 3/2006 | Rowse et al. | 455/41.1 |
| 2006/0097848 A1 | 5/2006 | Davidson et al. | |
| 2006/0111053 A1 * | 5/2006 | Wu et al. | 455/90.3 |
| 2006/0116127 A1 | 6/2006 | Wilhoite et al. | |
| 2006/0229113 A1 * | 10/2006 | Rowse | 455/574 |
| 2006/0237528 A1 * | 10/2006 | Bishop et al. | 235/380 |
| 2006/0238297 A1 | 10/2006 | Tang et al. | |
| 2006/0280149 A1 | 12/2006 | Kuhl et al. | |
| 2007/0018832 A1 | 1/2007 | Beigel et al. | |
| 2007/0030124 A1 | 2/2007 | Lee | |
| 2007/0032261 A1 | 2/2007 | Boyer et al. | |
| 2007/0037605 A1 | 2/2007 | Logan | |
| 2007/0060212 A1 | 3/2007 | Shah | |
| 2007/0066278 A1 | 3/2007 | Hong | |
| 2007/0120679 A1 | 5/2007 | Shin et al. | |
| 2007/0138299 A1 * | 6/2007 | Mitra | 235/492 |
| 2007/0159330 A1 | 7/2007 | Chakraborty et al. | |
| 2007/0178935 A1 | 8/2007 | Shim et al. | |
| 2007/0197261 A1 | 8/2007 | Humbel | |
| 2007/0262134 A1 * | 11/2007 | Humphrey et al. | 235/379 |
| 2007/0263595 A1 | 11/2007 | Charrat | |
| 2007/0274242 A1 * | 11/2007 | Lamacraft et al. | 370/310 |
| 2007/0286171 A1 | 12/2007 | Guan | |
| 2007/0293202 A1 | 12/2007 | Moshir et al. | |
| 2008/0011833 A1 * | 1/2008 | Saarisalo | 235/382 |
| 2008/0018433 A1 * | 1/2008 | Pitt-Pladdy | 340/10.4 |
| 2008/0027815 A1 * | 1/2008 | Johnson et al. | 705/17 |
| 2008/0040242 A1 | 2/2008 | Chang et al. | |
| 2008/0057876 A1 * | 3/2008 | Hsia et al. | 455/69 |
| 2008/0059374 A1 * | 3/2008 | Gangi | G06K 7/0004 705/41 |
| 2008/0068130 A1 * | 3/2008 | Batta | H04L 63/0492 340/10.1 |
| 2008/0078831 A1 * | 4/2008 | Johnson et al. | 235/380 |
| 2008/0100419 A1 * | 5/2008 | Jatschka | G06K 19/0723 340/10.1 |
| 2008/0143487 A1 * | 6/2008 | Hulvey | 340/10.34 |
| 2008/0146167 A1 | 6/2008 | Rofougaran | |
| 2008/0171579 A1 | 7/2008 | Grubek | |
| 2009/0058652 A1 | 3/2009 | Hardy et al. | |
| 2009/0090783 A1 | 4/2009 | Killian et al. | |
| 2009/0102660 A1 | 4/2009 | Evans et al. | |
| 2009/0143013 A1 | 6/2009 | Hatano et al. | |
| 2009/0170519 A1 | 7/2009 | Wilhoite et al. | |
| 2009/0209283 A1 * | 8/2009 | Yang | H04B 1/0057 455/553.1 |

(56) References Cited

U.S. PATENT DOCUMENTS

| | | | |
|---|---|---|---|
| 2009/0221232 A1* | 9/2009 | Estevez et al. | 455/41.1 |
| 2009/0243810 A1* | 10/2009 | Pendlebury et al. | 340/10.4 |
| 2009/0291634 A1* | 11/2009 | Saarisalo | 455/41.1 |
| 2010/0001838 A1* | 1/2010 | Miodownik et al. | 340/10.1 |
| 2010/0026454 A1* | 2/2010 | Rowse et al. | 340/10.1 |
| 2010/0128642 A1 | 5/2010 | Bossler et al. | |
| 2010/0137024 A1 | 6/2010 | Maguire | |
| 2010/0158077 A1 | 6/2010 | Mahany | |
| 2010/0217707 A1* | 8/2010 | Phillips | 705/41 |
| 2010/0239079 A1 | 9/2010 | Bao | |
| 2010/0281261 A1* | 11/2010 | Razzell | 713/171 |
| 2011/0021246 A1* | 1/2011 | Rofougaran | 455/552.1 |
| 2011/0312271 A1* | 12/2011 | Ma | H04B 5/00 455/41.1 |
| 2012/0019363 A1* | 1/2012 | Fein | G06K 19/072 340/10.1 |
| 2012/0133483 A1* | 5/2012 | Zatloukal et al. | 340/5.7 |
| 2012/0150601 A1* | 6/2012 | Fisher | 705/14.23 |
| 2012/0284194 A1* | 11/2012 | Liu et al. | 705/66 |
| 2013/0178159 A1* | 7/2013 | Xie et al. | 455/41.1 |
| 2013/0337770 A1* | 12/2013 | Huque et al. | 455/410 |
| 2014/0145823 A1* | 5/2014 | Aase | 340/5.61 |
| 2014/0162721 A1 | 6/2014 | Zatloukal et al. | |
| 2014/0167914 A1 | 6/2014 | Zatloukal et al. | |
| 2015/0208245 A1* | 7/2015 | Robinton et al. | 455/411 |

OTHER PUBLICATIONS

Non-Final Office Action for U.S. Appl. No. 10/560,262, mailed Mar. 4, 2009, 5 pages.
Final Office Action for U.S. Appl. No. 10/560,262, mailed Aug. 17, 2009, 6 pages.
Advisory Action for U.S. Appl. No. 10/560,262, mailed Nov. 13, 2009, 3 pages.
Non-Final Office Action for U.S. Appl. No. 10/560,262, mailed Dec. 24, 2009, 6 pages.
Final Office Action for U.S. Appl. No. 10/560,262, mailed Jun. 22, 2010, 14 pages.
Notice of Non-Compliant Amendment (37 CFR 1.121) and Advisory Action for U.S. Appl. No. 10/560,262, mailed Sep. 8, 2010, 5 pages.
Advisory Action for U.S. Appl. No. 10/560,262, mailed Oct. 13, 2010, 3 pages.
Non-Final Office Action for U.S. Appl. No. 10/560,262, mailed Mar. 31, 2011, 12 pages.
Notice of Allowance for U.S. Appl. No. 10/560,262, mailed Nov. 1, 2011, 13 pages.
Non-Final Office Action for U.S. Appl. No. 13/363,202, mailed Jul. 16, 2012, 5 pages.
Notice of Allowance for U.S. Appl. No. 13/363,202, mailed Nov. 27, 2012, 8 pages.
Non-Final Office Action for U.S. Appl. No. 14/097,141, mailed Mar. 14, 2014, 10 pages.
Final Office Action for U.S. Appl. No. 14/097,141, mailed Sep. 16, 2014, 12 pages.
Non-Final Office Action for U.S. Appl. No. 14/097,152, mailed Mar. 31, 2014, 11 pages.
Final Office Action for U.S. Appl. No. 14/097,152, mailed Jul. 21, 2014, 12 pages.
Non-final Office Action for U.S. Appl. No. 14/097,152, mailed Oct. 28, 2015, 9 pages.
Final Office Action for U.S. Appl. No. 14/097,152, mailed May 20, 2016, 10 pages.

* cited by examiner

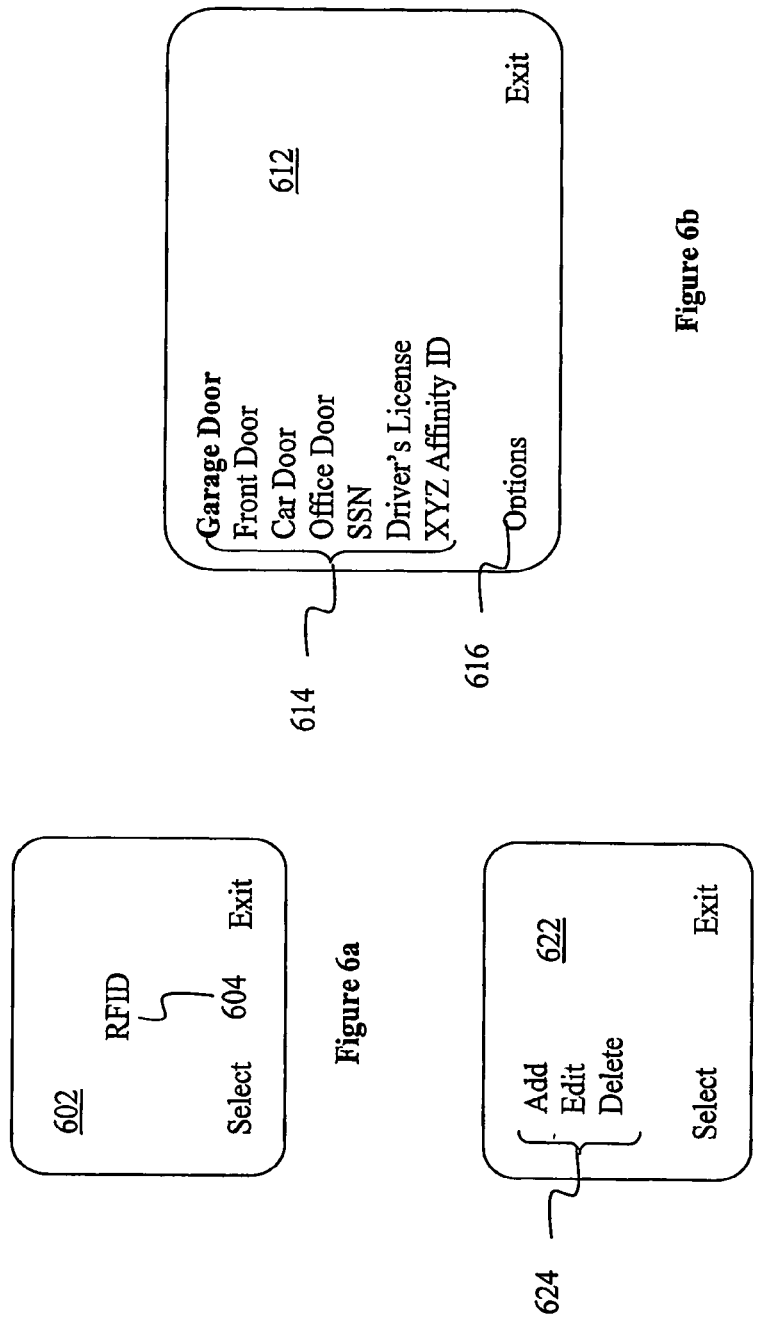

EMULATED RADIO FREQUENCY IDENTIFICATION

RELATED APPLICATION

This application is a continuation of U.S. patent application Ser. No. 13/363,202, filed Jan. 31, 2012 and entitled "Emulated Radio Frequency Identification," now U.S. Pat. No. 8,381,974, which is a continuation of U.S. patent application Ser. No. 10/560,262, filed Dec. 9, 2005 and entitled "Emulated Radio Frequency Identification," now U.S. Pat. No. 8,127,984, which was the National Stage of International Application No. PCT/US04/18397, filed Jun. 10, 2004 and entitled "Emulated Radio Frequency Identification," which itself claims the benefit of U.S. Provisional Application No. 60/478,245, entitled "Radio Frequency Identification Using Mobile Communication Device" and filed Jun. 13, 2003.

FIELD OF THE INVENTION

The present invention relates to the fields of security, communication, and data processing. More specifically, the present invention is related to an emulated radio frequency data input method.

BACKGROUND OF THE INVENTION

It wasn't that long ago, even residents in medium size cities still feel secured enough to leave their homes unlocked and/or their garages open. In general, one can access one's place of employment, including parking facilities as well as one's office without identification or access keys.

In the world of commerce, things were also simpler. One typically may shop and consume goods and services, at relatively low prices, without having to be affiliated with any programs or entities.

However, the world has become a lot more complex in recent years. Virtually, all properties of any value, premises, including one's home, have to be secured, even for relatively small towns and cities. One can hardly shop and consume any goods and services, without having signed up with some promotional frequent "usage" programs or becoming affiliated with the commercial entities. The employment of affinity marketing has reached a point even neighboring grocery chains employ them, and not just airlines, hotels, or wholesale discount retailers.

As a result, it is not uncommon to find a person having to carry a number of physical keys and access/identification cards/tags to gain access to secured premises, such as one's home, office, parking garage, and so forth. Additionally, the person is likely to carry a number of remote security control devices, such as a key with remote control for gaining access to his/her vehicle, a garage door opener for gaining access to the person's garage at home, and so forth. The person is also likely to carry a number of affinity identification cards with member identifiers identifying the person as being affiliated with certain co-op or frequent patronage programs, such as wholesale discount retailers, airline or hotel frequent traveler program, and so forth, that entitle the person to certain benefits, such as discounts or rewards.

BRIEF DESCRIPTION OF THE DRAWINGS

The present invention will be described by way of exemplary embodiments, but not limitations, illustrated in the accompanying drawings in which like references denote similar elements, and in which:

FIG. 6a-6h illustrate a number of example screens of an end user interface, suitable for use to practice the present invention, in accordance with one embodiment.

DETAILED DESCRIPTION OF EMBODIMENTS OF THE INVENTION

Figure 1:
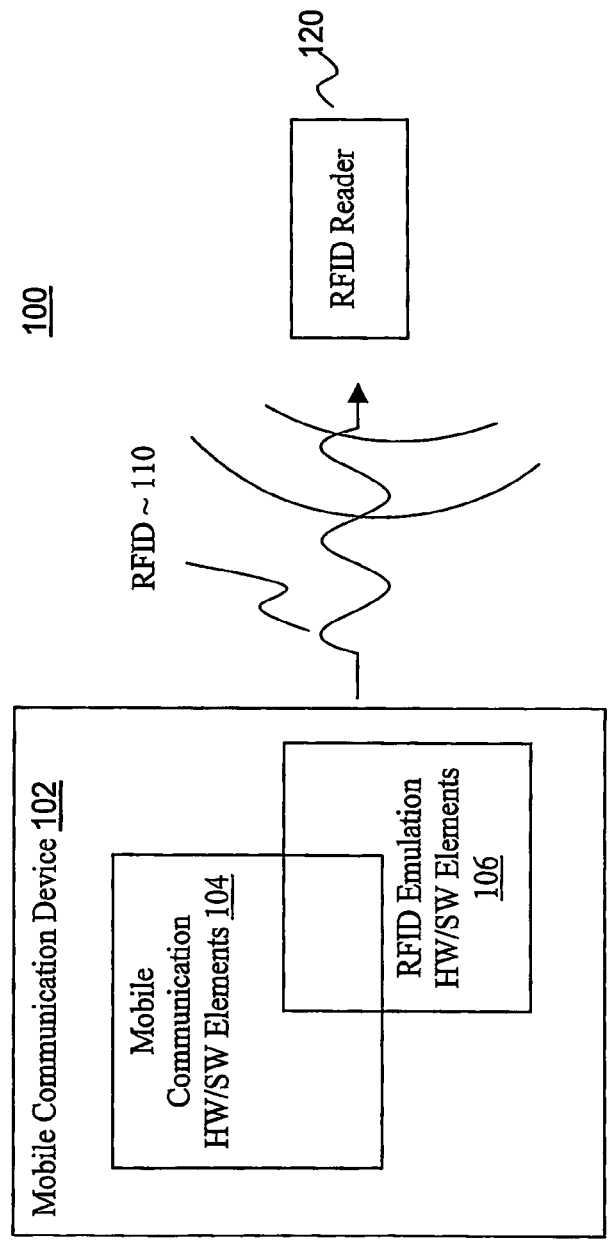
FIG. 1 illustrates an overview of the present invention, in accordance with one embodiment.

Embodiments of the present invention includes an emulated RFID method, more specifically, an emulated RFID method, using a mobile communication device, including the device itself, and certain hardware and/or software embodied therein for the practice of the emulated RFID method.

In the following description, various aspects of the illustrative embodiments of the present invention will be described. However, alternate embodiments may be practiced with only some or all aspects of the illustrative embodiments of the present invention. For purposes of explanation, specific numbers, materials and configurations are set forth in order to provide a thorough understanding of the present invention. However, alternate embodiments may be practiced without the specific details. In other instances, well-known features are omitted or simplified in order not to obscure the essence of the illustrative embodiments of the present invention.

TERMINOLOGY

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| CDROM | Compact Disc Read Only Memory |
| DDRAM | Dynamic Direct Random Access Memory |
| DVD | Digital Versatile Disc |
| EEPROM | Electrically Eraseable Programmable Read-Only-Memory |
| HTTP | HyperText Transmission Protocol |
| SDRAM | Statis Direct Random Access Memory |
| SMS | Small Messaging Service |

The term "number" as used In this application to describe a data, including both its usage in the specification and the claims, typically refers to numeric data, as the word "number" is conventionally used in mathematics. However, in certain contexts, the "number" may also include alphabet or special characters, as the term is conventionally understood by those skilled in the art in those contexts. For examples, a drivers license number, a passport number, an employee number, or a student ID number, as each of these terms is conventionally used, often includes one or more alphabets or special characters, even though they are referred to as "numbers". The term accordingly is to be given the meaning that is consistent with the context under which the term is used.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase In one embodiment" is used repeatedly. The phrase generally does not refer to the same embodiment, however, it may, The terms "comprising", "having" and Including" are synonymous, unless the context dictates otherwise.

Overview

Refer now to FIG. 1, wherein a block diagram illustrating an overview of the present invention 100, in accordance with one embodiment, is shown. As illustrated, for the embodiment, mobile communication device 102 is equipped with hardware and/or software elements 104 to perform its primary function, which is to facilitate a user of device 102 to engage in communication with another user of another communication device (not shown). In various embodiments, the communication may be audio (such as phone calls), textual (such as messaging) and/or visual (such as airtexting using light sources). Additionally, for the embodiment, mobile communication device 102 is equipped with hardware and/or software elements 106 to facilitate provision or transfer of a key/identifier in a form a radio frequency signal 110, which may be read e.g. by a radio frequency identifier (RFID) reader 120. In turn, the provision of RFID 110 may be responded to by a system (not shown) with which RFID reader 120 is a part or coupled to.

As depicted in FIG. 1, blocks 104 and 106 "Intersect" with one another. The "intersection" represents the fact that in preferred embodiments of the present invention, substantial portions of the hardware and/or software elements employed to provide a RFID, are the same elements employed to facilitate the primary function of device 102, i.e. to facilitate a user in communicating with another user of another communication device.

In other words, Illustrative embodiments of the present invention advantageously leverage on existing elements of mobile communication device 102, and supplement them, to enable mobile communication device 102 to be able to provide a RFID, emulating a RFID transponder, as well as facilitating user communication.

As will be described in more detail below, in preferred embodiments, mobile communication device 102 is equipped to provide RFID, emulating an active and/or a passive RFID transponder.

Further, RFID 110 may be any keys and/or identifiers, including but not limited to security keys, such as garage door "keys", exterior or interior door keys, or identifiers, such as, employee numbers, driver's license numbers, social security numbers, credit card numbers (optionally, including expiration dates), affinity program member identifiers, and so forth.

Continue to refer to FIG. 1, except for the present invention incorporated therein, mobile communication device 102 represents a broad range of mobile communication devices known in the art, including but are not limited to wireless mobile phones and personal digital assistants equipped with communication capability.

The term "wireless mobile phone" as used herein, including the specification and the claims, refers to the class of telephony devices equipped to facilitate a user in communicating with another user of another communication device, notwithstanding the user's movement around different geographic areas, so long the wireless mobile phone is In contact with a base/service station of a wireless network service provider. The term includes the analog as well as the digital subclasses. Communication may be voice and/or data, audio, textual and/or visual. The other user/communication device may be mobile or land line based.

RFID reader 120 represents a broad range of such devices known in the art or to be designed. Currently, most RFID readers 120 employ proprietary formats/protocols. That is, RFID readers 120 of different manufacturers tend to employ different frequencies, amplitudes, and/or keying Schemes (which may be frequency shifting keying (FSK), amplitude shifting keying (ASK) or phase shifting keying (PSK)).

Various embodiments of the methods of the present inventions, including elements 106, in particular, added elements, will be described in turn below.

Method

Figure 2:
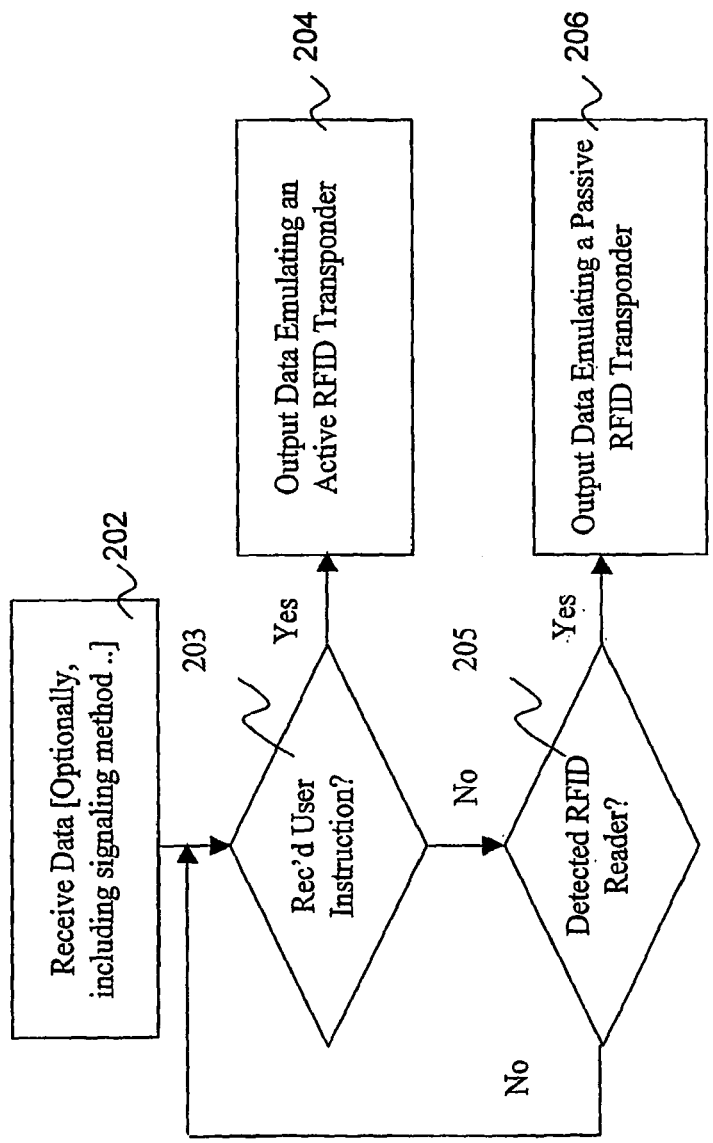
FIG. 2 illustrates a method view of the present invention, in accordance with one embodiment.

FIG. 2 illustrates a method view of the present invention, in accordance with one embodiment. As illustrated, device 102 is first provided with the RFIDs, block 202. The RFIDs may be provided in any one of a number of known or to be designed manners, including but are not limited to
- manual entry, using a keypad of device 102,
- read into device 102, from an access/identification card, using a magnetic or optical card reader of device 102,
- downloaded Into device 102, from a coupled computing device, through a serial/parallel port of device 102 or through a network interface of device 102 using SMS or HTTP messages.

Typically, provision of a RFID will include the manner the RFID is to be outputted, i.e. signaled. As alluded to earlier, the manner it is to be signaled is dependent on the format/protocol employed by the Intended RFID reader 120. For examples, for a garage door key, the format/protocol employed by RFID reader 120 of the garage opener system, and for an affinity program member identifier, the format/protocol employed by RFID reader 120 of the point-of-sale system of the entity offering the affinity program.

Alternatively, a default signaling format/protocol, such as an industry standard, the most popular proprietary format/protocol, or a selected proprietary format/protocol maybe assumed instead, when one is not provided.

During operation, in response to a user instruction, typically after the user has selected the RFID to be outputted from a number of RFIDs stored in device 102, block 203, device 102 outputs the selected RFID as instructed, emulating an active RFID transponder, block 204.

For the embodiment, one RFID, e.g. an access key/identifier (such as an employee number), may also be selected/designated as a default RFID, the output of which may be emulated in a passive manner. That is, the selected/designated default RFID will be outputted automatically, whenever device 102 is within the proximal presence, or more specifically, the operational space, of an intended RFID reader 120.

Accordingly, device 102 monitors for probing signals of an intended RFID reader 120 (or a type of RFID readers 120), to determine whether device 102 is within the operational space of such a RFID reader 120, block 205. On so determining, device 102 outputs the designated RFID automatically, emulating a passive RFID transponder, block 206.

A Hardware/Software Implementation

Figure 3:
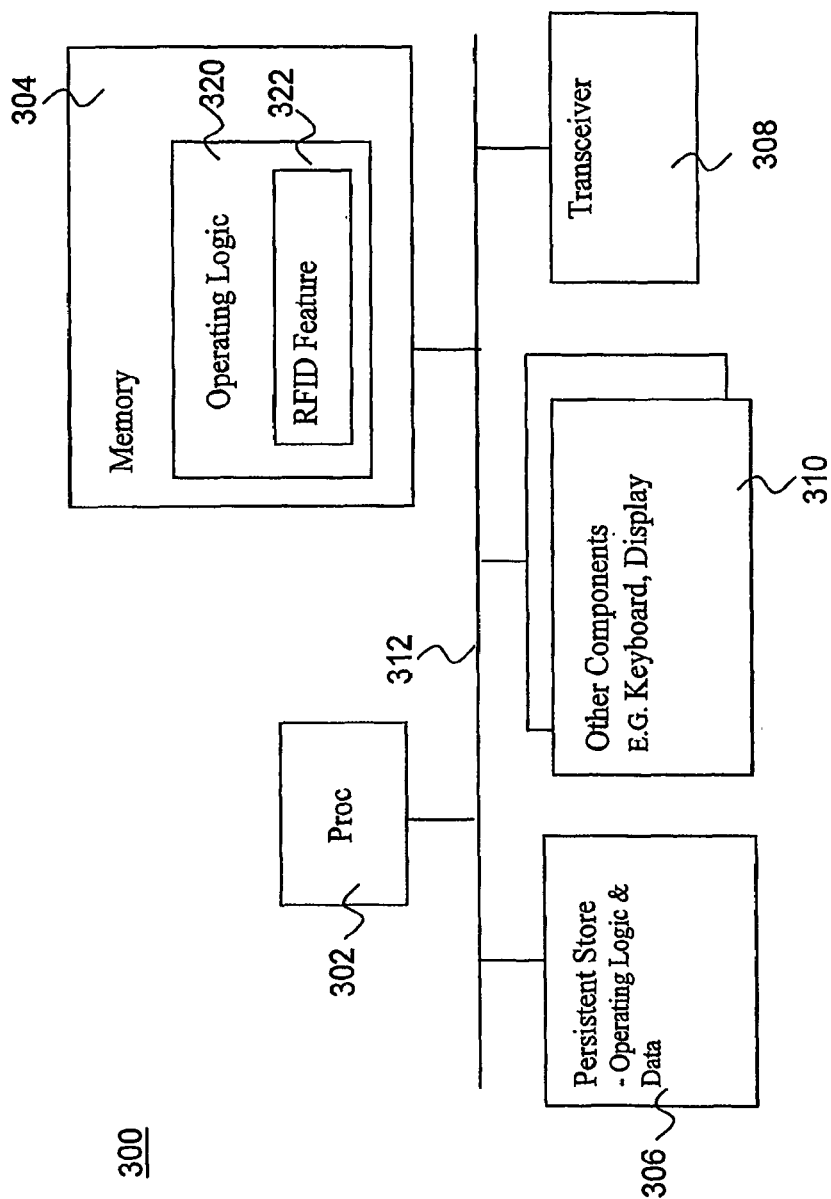
FIG. 3 illustrates the relevant hardware elements of the device of FIG. 1 in further details, in accordance with one embodiment.

FIG. 3 illustrates the relevant elements of device 102, in accordance with one embodiment. As illustrated, for the embodiment, device 102 includes processor 302, memory 304, persistent store 306, transceiver 308, and a number of other components 310, coupled to each other via bus 312.

Persistent store 306 and memory 304 are employed to store permanent and working copies of a software implementation of the operating logic 320 of device 102, including the supplemental RFID feature 322. In various embodiments, persistent store 306 may be an EEPROM (or like kind variants, such as a Flash Memory, a Memory Stick), a magnetic or optical disk drive, a CDROM, a DVD drive and so forth. Memory 304 may be any SORAM, DDRAM or other high speed volatile as way as non-volatile storage devices known in the art.

Processor 302 is employed to execute operating logic 320, including RFID feature 322. As will be readily apparent from the description to follow, operating logic 320 may be implemented in any one of a number of suitable system programming languages, including but not limited to high level languages that may be compiled into executable instructions supported by processor 302. Processor 302 may be any one of a number of processors designed or to be designed for mobile devices.

Except for transceivers 308, RHO feature 322 and the manner the various elements of FIG. 3 are used to practice the present Invention, the other illustrated elements are known in the art, and accordingly will not be further described. One embodiment of transceiver 308 will be described referencing FIG. 4, and one embodiment of RFD feature 322 will be described, referencing FIG. 6-7.

As described earlier, processor 302, memory 304, persistent store 306 and bus 312 may be shared elements of device 102, also employed to implement the primary communication function of device 102. However, in alternate embodiments, dedicated elements may be employed for some or all of these elements instead.

Figure 5A:
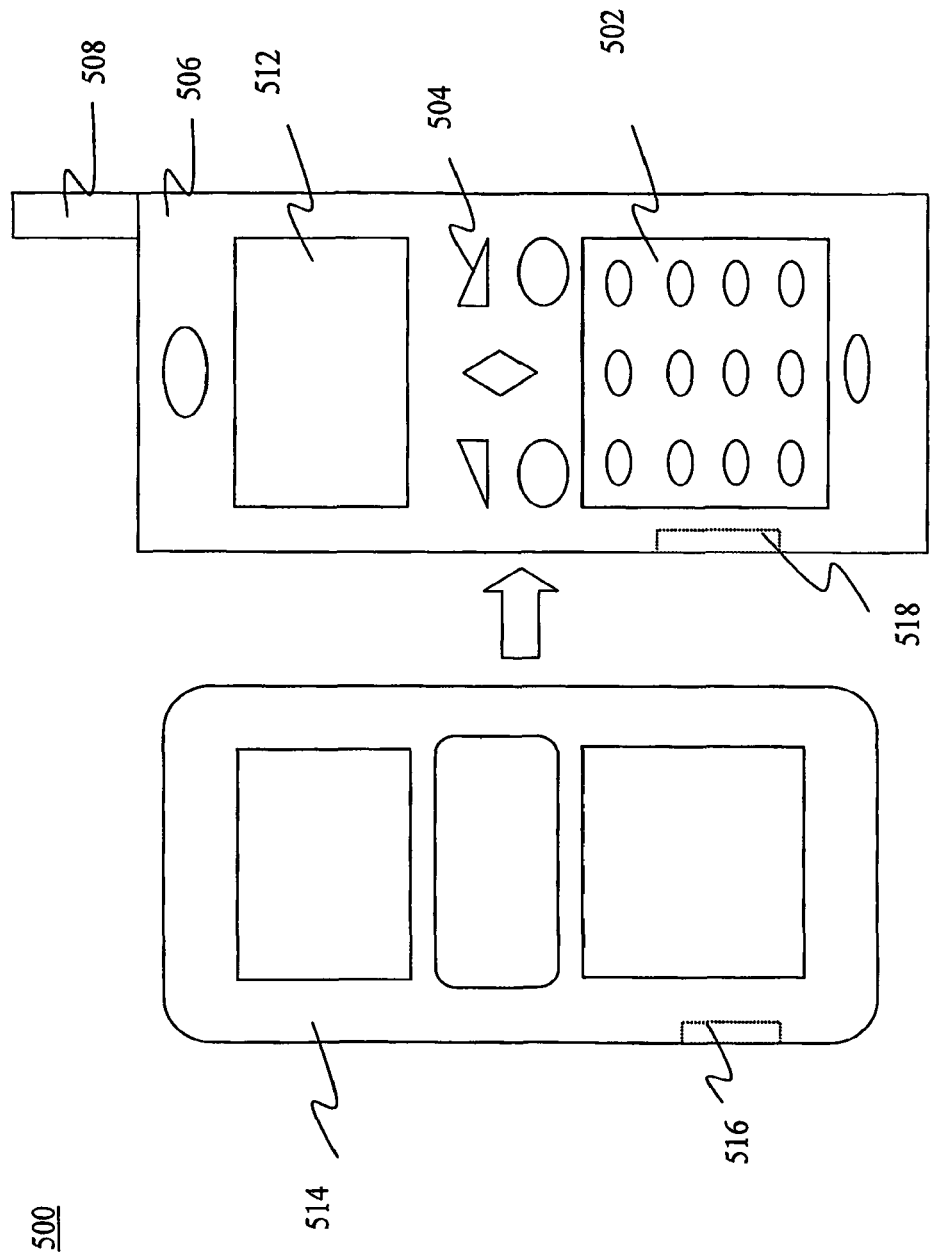
FIGS. 5a-5b illustrate the exploded views of two embodiments of the mobile communication device of FIG. 1.

In one embodiment, device 102 is a wireless mobile telephone, an exploded view of which is illustrated in FIG. 5a. Wireless mobile phone 500, in addition to the earlier described elements, also includes display 506, control buttons 504, keypad 502, antenna 508, body 512 and cover 514. Body 512 is substantially rectangular in shape. Further, body 512 is palm-sized or smaller.

For the embodiment, cover 514 includes embedded electronic components having instructions, data, and/or locations to obtain such instructions and/or data to personalize, customize and/or enhance phone 500. Phone 500 includes complementary electronic component interface 516 in support of such personalization, customization and/or enhancement.

Cover 514 may form a part of housing 512, i.e. a required element to complete phone 500, or it may be an accessory to be adorned by phone 500, i.e. not a required element to complete phone 500.

Figure 5B:
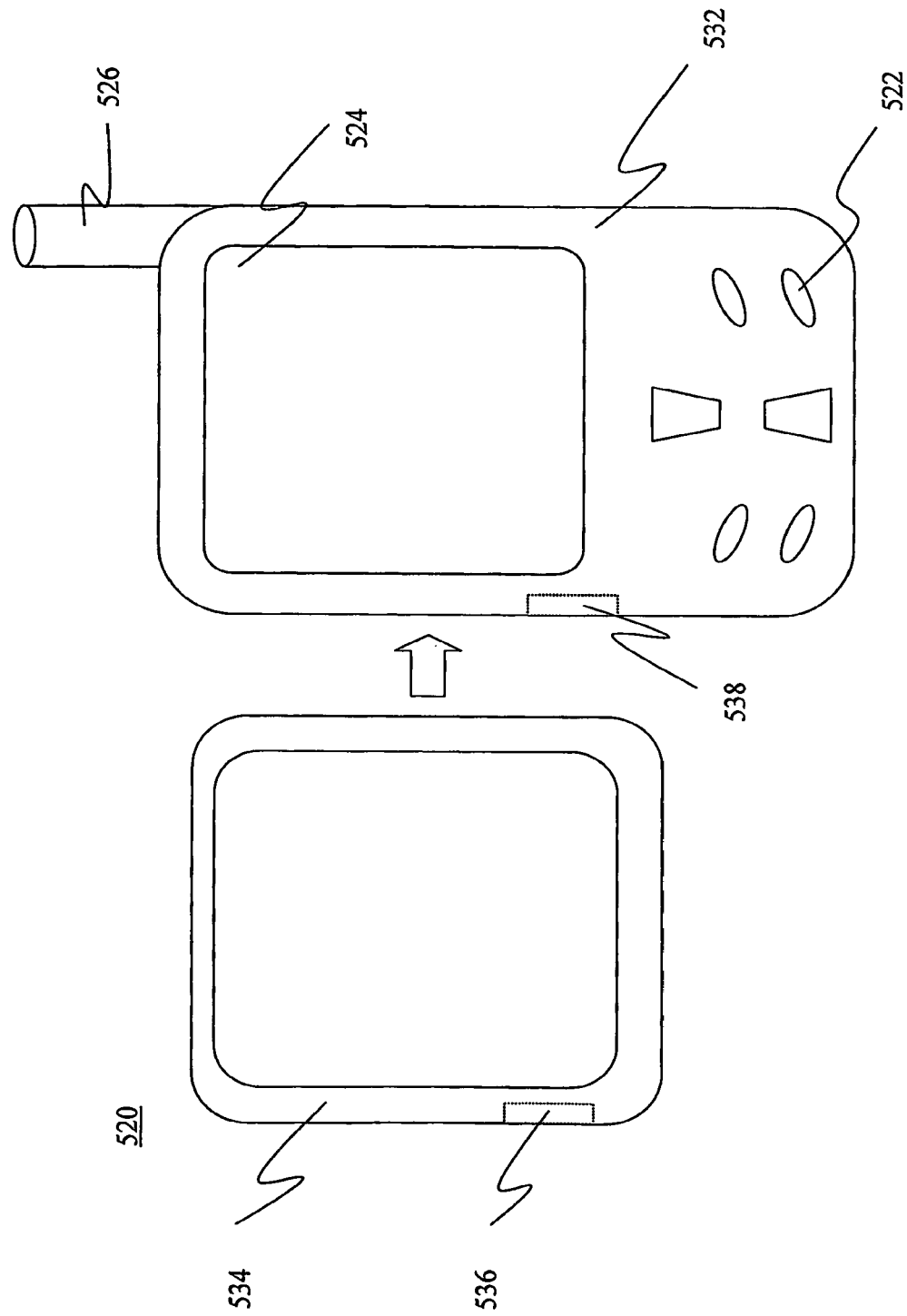

In another embodiment, device 102 is a PDA, an exploded view of which, is illustrated in FIG. 5b. PDA 502, in addition to the earlier described elements, also includes display 524, control buttons 522, antenna 526, body 532, and cover 534. Body 530 is also substantially rectangular in shape, as well as palm-sized or smaller.

Similarly, for the embodiment, cover 534 includes embedded electronic components having instructions, data, and/or locations to obtain such instructions and/or data to personalize, customize and/or enhance PDA 520. PDA 520 includes complementary electronic component interface 536 in support of such personalization, customization and/or enhancement.

Cover 534 may form a part of housing 532, i.e. a required element to complete PDA 520, or it may be an accessory to be adorned by PDA 520, i.e. not a required element to complete PDA 520.

Figure 5C:
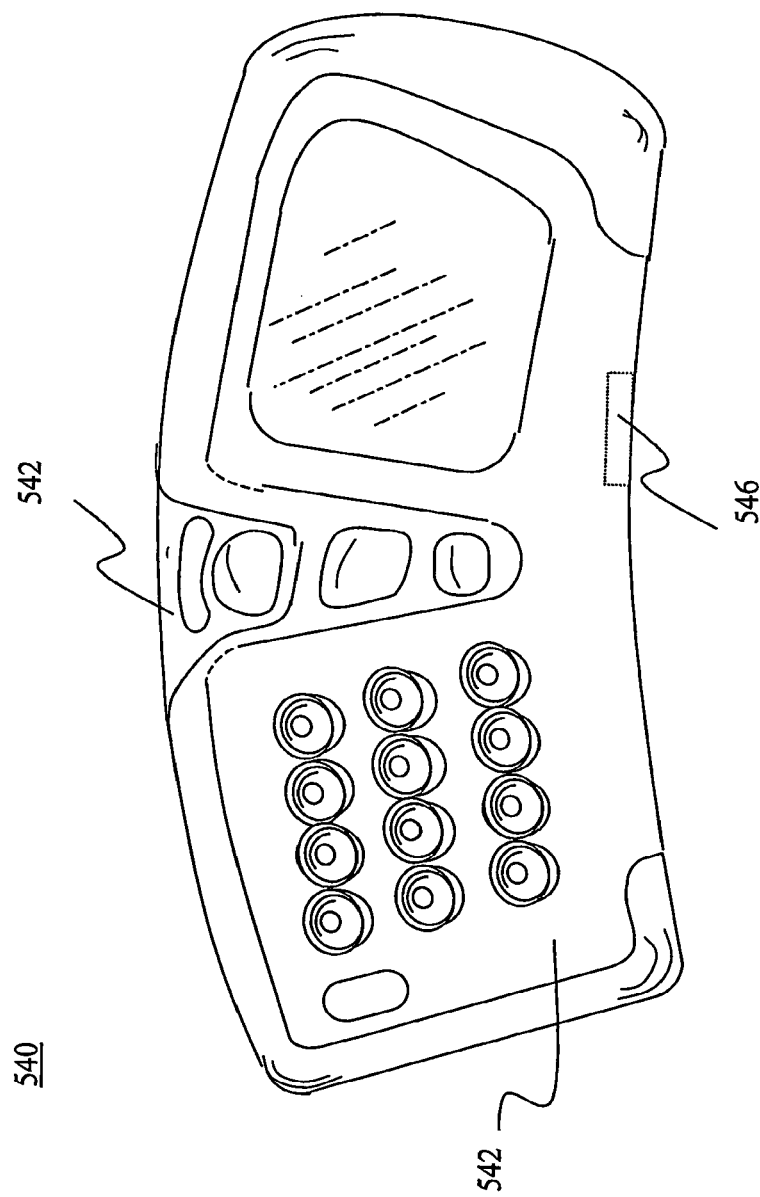
FIGS. 5c-5d illustrate an exploded view of another embodiment of the mobile communication device of FIG. 1.
Figure 5D:
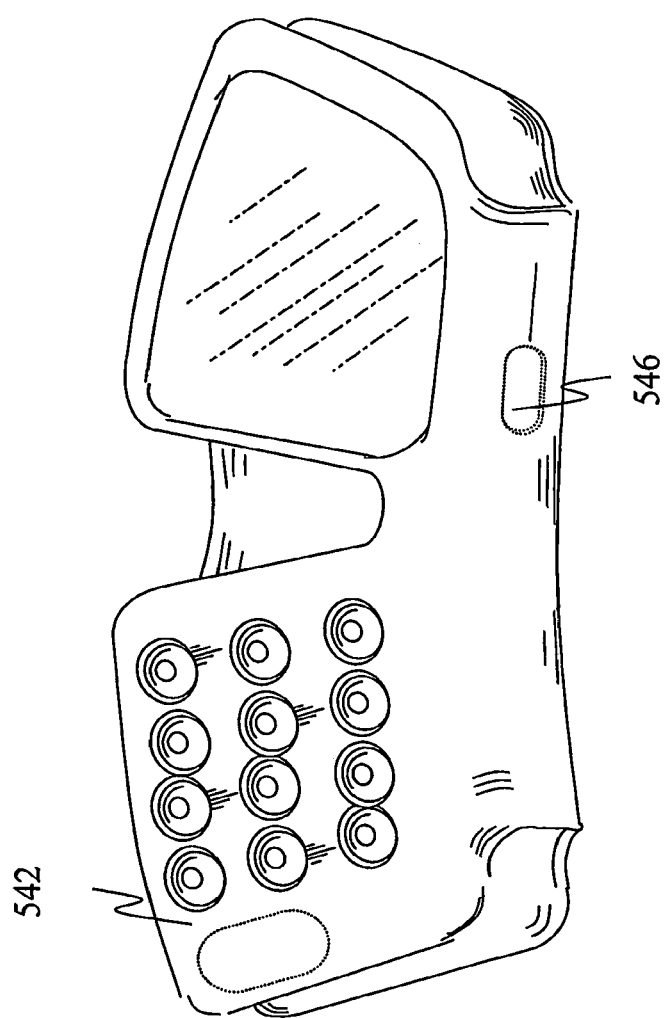

FIG. 5c-5d illustrate yet another embodiment of device 102, another wireless mobile telephone, an exploded view of which is illustrated. Wireless mobile phone 540 is similarly constituted as the earlier described embodiments, including body 542 and cover 544. However, body 542 has a substantially boomerang or banana shape. Body 542. is also typically palm-sized or smaller.

For the embodiment, cover 544 also includes embedded electronic components having instructions, data, and/or locations to obtain such Instructions and/or data to personalize, customize and/or enhance phone 540. Phone 540 includes complementary electronic component interface (not shown) in support of such personalization, customization and/or enhancement.

Cover 544 may form a part of housing 542, i.e. a required element to complete phone 540, or it may be an accessory to be adorned by phone 540, i.e. not a required element to complete phone 540.

In all or selected one(s) of these embodiments, some or all elements 106 in support of the RFID feature of the present invention may be provided through embedded electronic components of the housing/accessory covers.

Smart covers are the subject matters of subject matter of co-pending U.S. application Ser. No. 10/087,098, filed Mar. 1, 2002, entitled "Personalizing Electronic Devices and Smart Covering", and U.S. application Ser. No., <insert>, filed May 2, 2003, entitled "Personalization of Mobile Electronic Devices and Smart Accessory Cover", which specifications are hereby fully incorporated by reference.

While all three embodiments of FIG. 5a-5d have been illustrated with smart covers and external antennas. In alternate embodiments, the present invention may be practiced without smart covers and/or external antennas. The present invention may be practiced with conventional covers, without embedded intelligence and/or internal antennas.

Transceiver

Figure 4:
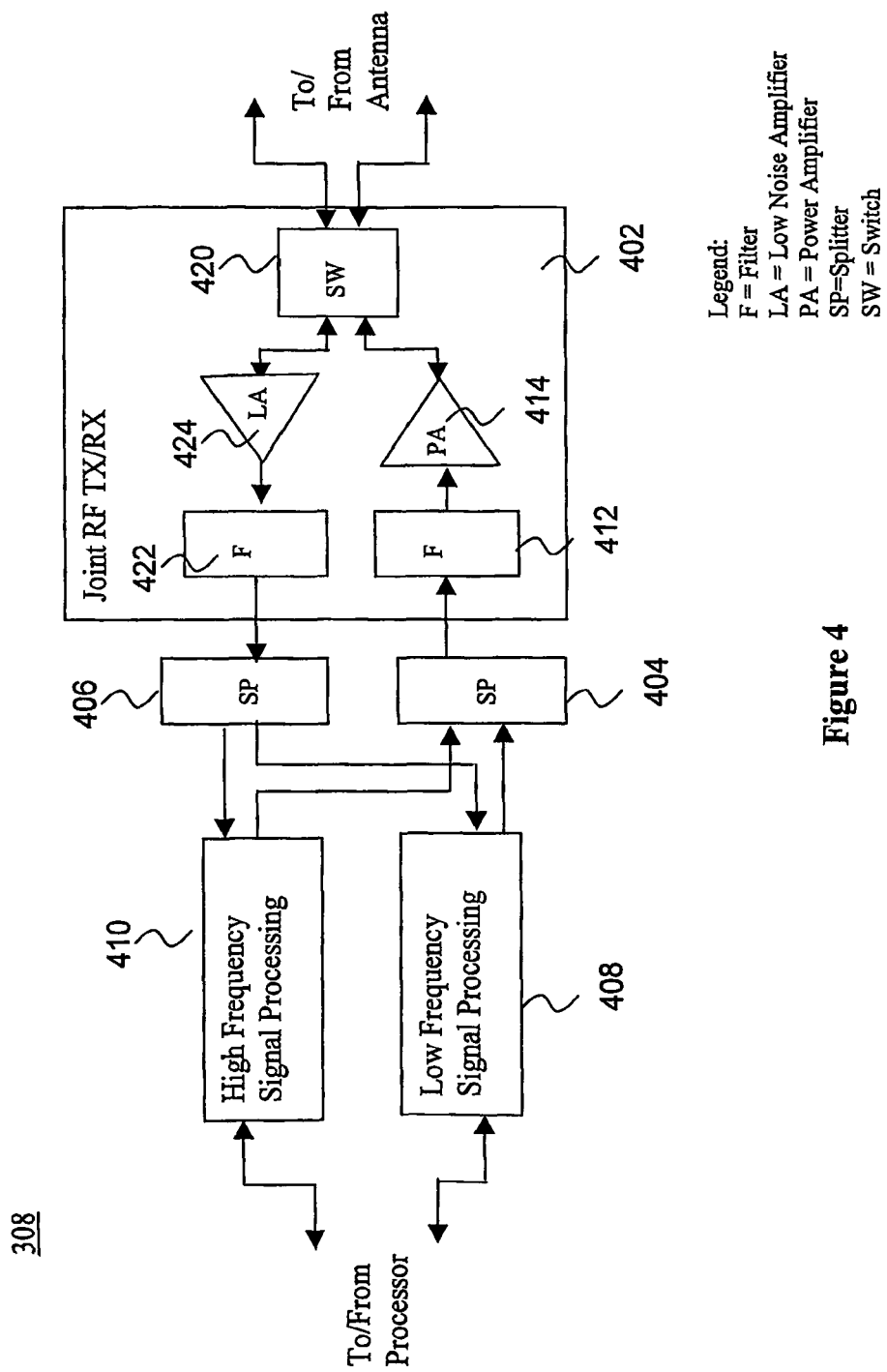
FIG. 4 illustrates the transceiver of FIG. 3 in further details, in accordance with another embodiment.

FIG. 4 illustrates transceiver 308 of FIG. 3 in further details, in accordance with one embodiment. As illustrated, for the embodiment, transceiver 308 includes a joint radio frequency (RF) transmit/receive (TX/RX) section 402, separate signal processing sections 408 and 410 for a range of higher frequencies and a range of low frequencies, switch 404 and splitter 406. The elements are coupled to each other as shown.

For the embodiment, joint RF TX/RX 402 includes in particular, switch 420, filters 412 and 422, low noise amplifier 424 and power amplifier 414, coupled to one another as shown. Switch 420 is employed to switch between transmitting and receiving RF signals. Filters 412 and 422, low noise amplifier 424 and power amplifier 414 are employed to perform their conventional filtering and amplification functions on the transmit and receive signals.

For transmission, switch 404 switches between the output of high frequency signal processing 410 and the output of low frequency signal processing 408 to the transmit path of Joint RF TX/RX 402.

For reception, splitter 406 splits the output of the receive path of Joint RF TX/RX 402 and provides the receive signal to high frequency signal processing 410 as well as low frequency signal processing 406.

For the embodiment, high frequency signal processing 410 performs up and down conversions of the transmit and receive signals of the primary communication function of mobile communication device 102, e.g. the transmit and receive signals of a voice call. In one embodiment, the transmit and receive signals are transmitted and received In the GHz ranges:

Low frequency signal processing 408, on the other hand, performs up and down conversions of the transmit and receive signals of the RFID feature, e.g. the output signal of a RFID to emulate either an active or a passive transponder, and the received probing signal of a RFID reader. In one embodiment, the transmit and receive signals are transmitted and received in the MHz ranges.

Up and down conversions, filtering, amplifications, and so forth, in and of themselves, except for the manner they are being used to provide RFIDs using a mobile communication device, are known in the art, accordingly, will not be further described.

RFID Feature

Figure 6E:
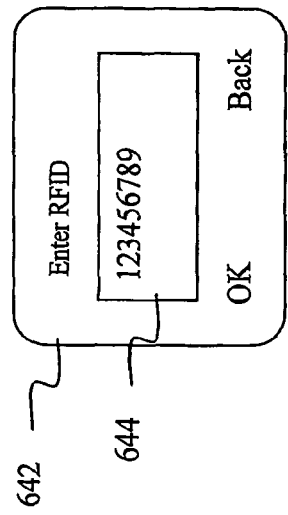
Figure 6G:
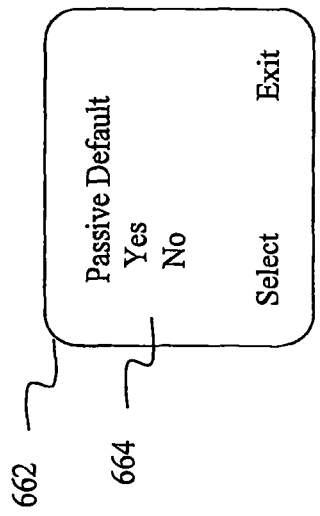
Figure 6D:
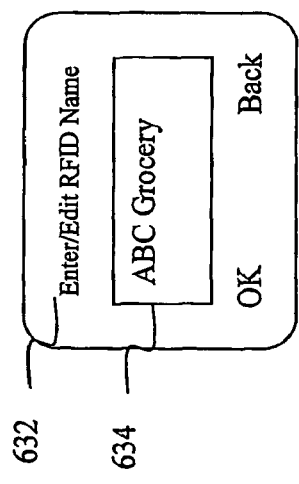
Figure 6F:
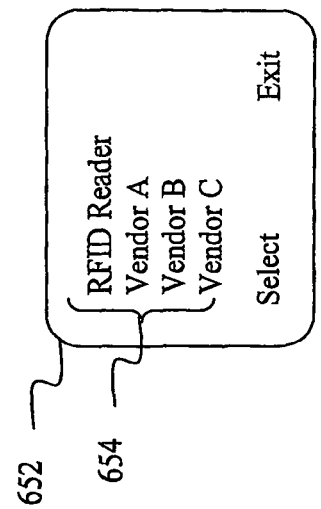
Figure 6H:
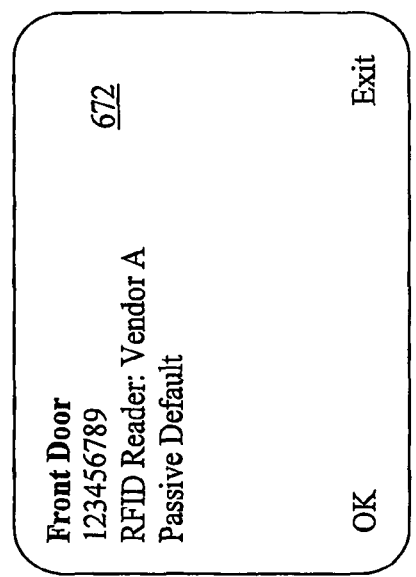
Figure 7:
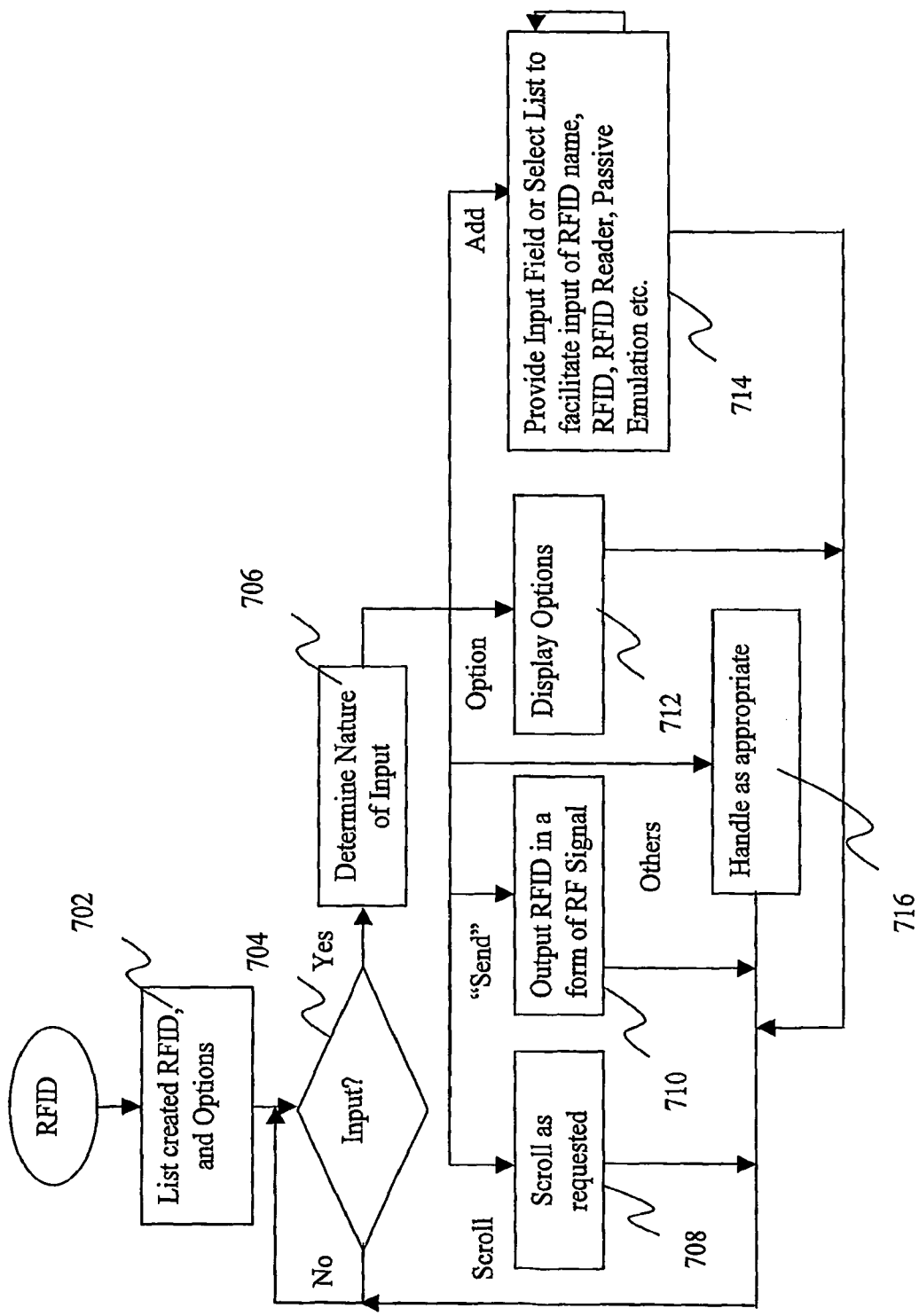
FIG. 7 illustrates the operational flow of the relevant aspects of the software in support of the RFD feature of the present invention, in accordance with one embodiment.

FIGS. 6-7 illustrate selected portions of an example end user interface, and the operational flow of the relevant aspects of RFD feature 322 respectively, in accordance with one embodiment. FIG. 6 comprises FIG. 6a-6h.

As illustrated in FIG. 6a, for the embodiment, the user interface Includes screen 602 having selectable text display "RFID" 604, with which a user may interact to launch the RFID function (by selecting text display 604, using e.g. control keys 604).

As illustrated in FIG. 6b, for the embodiment, the user interface further includes screen 612 enumerating a list of RFIDs 614 stored in device 102. List 614 may be displayed for example, among other situations, in response to a user's selection of text display 604 of screen 602. A user may select one of the RFIDs, and instruct device 102 to output the selected RFD in a form of an appropriate radio frequency signal, emulating provision of the RFID by an active RFID transponder, using e.g. a "send/call" key of device 102.

Screen 612 also includes selectable "option" button 616, with which a user may interact to display a list of RFID management options, using e.g. control keys 504.

As illustrated in FIG. 6c, for the embodiment, the user interface further includes screen 622 enumerating a list of RFID management options 624, such as "add", "edit" or "delete" RFIDs. List 624 may be displayed for example, among other situations, in response to a users selection of "option" 616 of screen 612.

As illustrated in FIG. 6d, for the embodiment, the user interface further includes screen 632 displaying field 634, through which a user may enter/edit a RFID name. Field 634 may be displayed for example, among other situations, in response to a users selection of "add" or "edit" of screen 622.

As illustrated in FIG. 6e, for the embodiment, the user interface further includes screen 642 displaying field 644, through which a user may enter/edit a RFID. Field 644 may be displayed for example, among other situations, in response to a user indicating completion of entry of a RFID name using screen 632.

As illustrated in FIG. 6f, for the embodiment, the user interface further includes screen 652 displaying a list of RFID types 654, with which a user may select and associate with a RFID. List 654 may be displayed for example, among other situations, in response to a user indicating completion of entry of a RED, using screen 642, thereby allowing the user to associate a RFID reader type with the entered RFID.

Each RFD reader type is assumed to have a deterministic RFID signaling format/protocol. Accordingly, by selecting the RFID reader type, the user is effectively selecting or specifying the RFID signaling format/protocol. in alternate embodiment, a user may be requested to select the RFD signaling format/protocol explicitly, as opposed to implicitly, in the illustrated embodiment.

As illustrated in FIG. 6g, for the embodiment, the user interface further includes screen 662 displaying a request 664 to confirm whether a RFD is to be selected or designated as the default RFID to be used for emulation of passive transponders. Request 664 may be displayed for example, among other situations, in response to a user selecting a RFID reader type, using screen 652, thereby allowing the user to (implicitly) associate a RFID format/protocol with the entered RFID.

As illustrated in FIG. 6f, for the embodiment, the user interface further includes screen 672 displaying a RFID and its details, including but not limited the intended RFID reader type, whether to be designated as the default RFID for use in emulating passive RFID. Request 674 may be displayed for example, among other situations, in response to a user selecting the "edit" option, using screen 622, or on completion of designating a RFID as the default RFID for emulating Passive transponders, using screen 662.

Operationally, as illustrated in FIG. 7, upon receipt of a request to launch the RFID function, support logic of the RFID feature 322 is loaded and given execution control, block 702. Thereafter, support logic 322 waits for user inputs, block 704.

On receipt of a user input/request, support logic 322 determines the nature of the input/request, block 706, taking into the context, i.e. the portion of the user interface being displayed, and with which the user just interacted in submitting the input/request.

As illustrated, on determining that the user has requested a current display list to be scrolled (e.g. RFID list 614 of screen 612), support logic 322 causes the list to be scrolled as requested. Thereafter, support logic 322 returns to block 708 and waits for further input.

Similarly, on determining that the user has requested a selected RFID to be sent (emulating output of the RFID by an active RFID transponder), support logic 322 causes the RFID to be outputted in a form of an appropriate RF signal (in accordance with the associated intended RFID reader type). Thereafter, support logic 322 again returns to block 710 and waits for further input.

On determining that the user has requested a list of options to be displayed (e.g. selection of "option" 616 of screen 612), support logic 322 causes the list of options to be displayed as requested. Thereafter, support logic 322 return to block 712 and waits for further input.

On determining that the user has requested to add a RFID (e.g. selection of "Add" of screen 622), support logic 322 facilitates addition of a RFID (e.g. successively guiding user entry of a RFID using screens 632-662. Thereafter, support logic 322 returns to block 714 and waits for further input.

These are a few examples of user inputs/requests support logic 322 may support. The present invention contemplates other user inputs/requests may also be supported, and handled accordingly, block 716.

CONCLUSION AND EPILOGUE

Thus, it can be seen from the above descriptions, a novel emulated RFID input method, using a mobile communication device, has been described. The present invention advantageously improved the ease of use for a user to provide data captured in a device to another system, especially for data captured in e.g. a mobile device.

While the present invention has been described in terms of the earlier described embodiments, those skilled in the art will. recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method for operating a mobile communication device comprising:
   receiving, by the mobile communication device, a radio frequency identification (RFID) probing signal from an RFID reader external to the mobile communication device;
   executing, on processing circuitry in the mobile communication device, instructions stored in a memory in the mobile communication device, the instructions configured to cause the mobile communication device to:
      output an RFID signal and output a voice call signal, wherein the RFID signal is output in response to the mobile communication device determining the mobile communication device is in an operational space of the RFID reader based upon receipt of the RFID probing signal, and wherein the voice call signal is output over a wireless network and within a radio frequency range that is different than a radio frequency range used to output the RFID signal.

2. The method of claim 1, wherein the RFID signal includes RFID data comprising a selected one of a security key and an identifier.

3. The method of claim 2, wherein the security key comprises a selected one of a garage door key, an exterior door key, an interior door key, and a motor vehicle door key.

4. The method of claim 2, wherein the identifier comprises a selected one of a social security number, a driver's license number, an affinity program account number, and a credit card number.

5. The method of claim 2, wherein the method further comprises facilitating a user in selecting the RFID data from a plurality of the RFID data using the mobile communication device.

6. The method of claim 2, wherein the method further comprises facilitating provision of the RFID data to the mobile communication device.

7. The method of claim 6, wherein facilitating provisioning of the RFID data to the mobile communication device includes facilitating provision of at least a signaling attribute associated with the outputting of the RFID data.

8. The method of claim 1, wherein the mobile communication device is one of a wireless mobile phone and a personal digital assistant equipped with communication capability.

9. A method for operating a mobile communication device comprising:
   executing, on processing circuitry in the mobile communication device, instructions stored in a memory in the mobile communication device, the instructions configured to cause the mobile communication device to monitor, output an RFID signal, and output a voice call signal;
   wherein the monitoring comprises monitoring for a proximal presence of a radio frequency identification (RFID) reader external to the mobile communication device and determining the mobile communication device is in an operational space of the RFID reader based on an RFID probing signal received by the mobile communication device from the RFID reader;
   wherein the outputting of the RFID signal comprises outputting the RFID signal in response to determining the mobile communication device is within the proximal presence of the RFID reader based u on receipt of the RFID robin signal; and
   wherein the outputting of the voice call signal comprises outputting the voice call signal over a wireless network in a radio frequency range different than a radio frequency range in which the RFID signal is output.

10. The method of claim 9, wherein the RFID signal includes RFID data comprising a security key.

11. The method of claim 10, wherein the security key comprises a door key.

12. The method of claim 11, wherein the door key comprises a selected one of a garage door key, an exterior door key, an interior door key, and a motor vehicle door key.

13. The method of claim 10, wherein the instructions are further configured to cause the mobile communication device to facilitate provision of the RFID data to the mobile communication device.

14. The method of claim 13, wherein facilitating provisioning of the RFID data to the mobile communication device includes facilitating provision of at least a signaling attribute associated with the outputting of the RFID data.

15. The method of claim 9, wherein the mobile communication device is one of a wireless mobile phone and a personal digital assistant equipped with communication capability.

16. A mobile communication device comprising:
   communication circuitry configured to output voice call signals in a first radio frequency range over a wireless network and output radio frequency identification (RFID) signals in a second radio frequency range, which is different than the first radio frequency range;
   processing circuitry; and
   a storage medium including instructions, which, when executed by the processing circuitry cause the mobile communication device to:
      monitor for a proximal presence of an RFID reader external to the mobile communication device via the communication circuitry, the monitoring comprising determining the mobile communication device is in an operational space of the RFID reader based on an RFID probing signal received by the mobile device from the RFID reader;
      output a voice call signal for transmission over a wireless network via the communication circuitry in the first radio frequency range; and
      output an RFID signal via the communication circuitry in response to detection of the proximal presence of the RFID reader external to the mobile communication device based upon receipt of the RFID probing signal, wherein the RFID signal is output in the second radio frequency range.

17. The mobile communication device of claim 16, wherein the RFID signal includes RFID data comprising a selected one of a security key and an identifier.

18. The mobile communication device of claim 17, wherein the security key comprises a door key.

19. The mobile communication device of claim 18, wherein the door key comprises a selected one of a garage door key, an exterior door key, an interior door key, and a motor vehicle door key.

20. The mobile communication device of claim 17, wherein the identifier comprises a selected one of a social security number, a driver's license number, an affinity program account number, and a credit card number.

21. The mobile communication device of claim 17, wherein the instructions are further configured to cause the mobile communication device to facilitate a user in selecting the RFID data from a plurality of RFID data.

22. The mobile communication device of claim 17, wherein the instructions are further configured to cause the mobile communication device to facilitate provision of the RFID data to the mobile communication device.

23. The mobile communication device of claim 22, wherein the instructions are further configured to cause the mobile communication device to include provisioning of at least a signaling attribute associated with the RFID data in the form of a radio frequency signal.

24. The mobile communication device of claim 17, wherein the RFID data includes information identifying a user.

25. The mobile communication device of claim 16, wherein the mobile communication device is one of a wireless mobile phone and a personal digital assistant equipped with communication capability.

26. A mobile communication device comprising:
communication circuitry configured to transmit voice call signals in a first radio frequency range over a wireless network;
processing circuitry; and
a memory storing instructions, which, when executed by the processing circuitry cause the mobile communication device to:
monitor for a proximal presence of a radio frequency identification (RFID) reader external to the mobile communication device via the communication circuitry, the monitoring comprising determining the mobile communication device is in an operational space of the RFID reader based on an RFID probing signal received by the mobile communication device from the RFID reader;
in response to determining the mobile communication device is in the operational space of the RFID reader based upon the receipt of the RFID probing signal, output an RFID signal via the communication circuitry in a second radio frequency range that is different than the first radio frequency range; and
transmit a voice call signal to another mobile communication device via the communication circuitry at least in part over a wireless network in the first radio frequency range.

27. The mobile communication device of claim 26, wherein the RFID signal includes RFID data comprising a security key.

28. The mobile communication device of claim 27, wherein the security key comprises a door key.

29. The mobile communication device of claim 28, wherein the door key comprises a selected one of a garage door key, an exterior door key, an interior door key, and a motor vehicle door key.

30. The mobile communication device of claim 26, wherein the instructions are further configured to cause the mobile communication device to facilitate provision of RFID data to the mobile communication device.

31. The mobile communication device of claim 30, wherein the instructions are further configured to cause the mobile communication device to include provisioning of at least a signaling attribute associated with the outputting of the RFID data in the form of a radio frequency signal.

32. The mobile communication device of claim 26, wherein the mobile communication device is one of a wireless mobile phone and a personal digital assistant equipped with communication capability.

* * * * *